Patented May 22, 1951

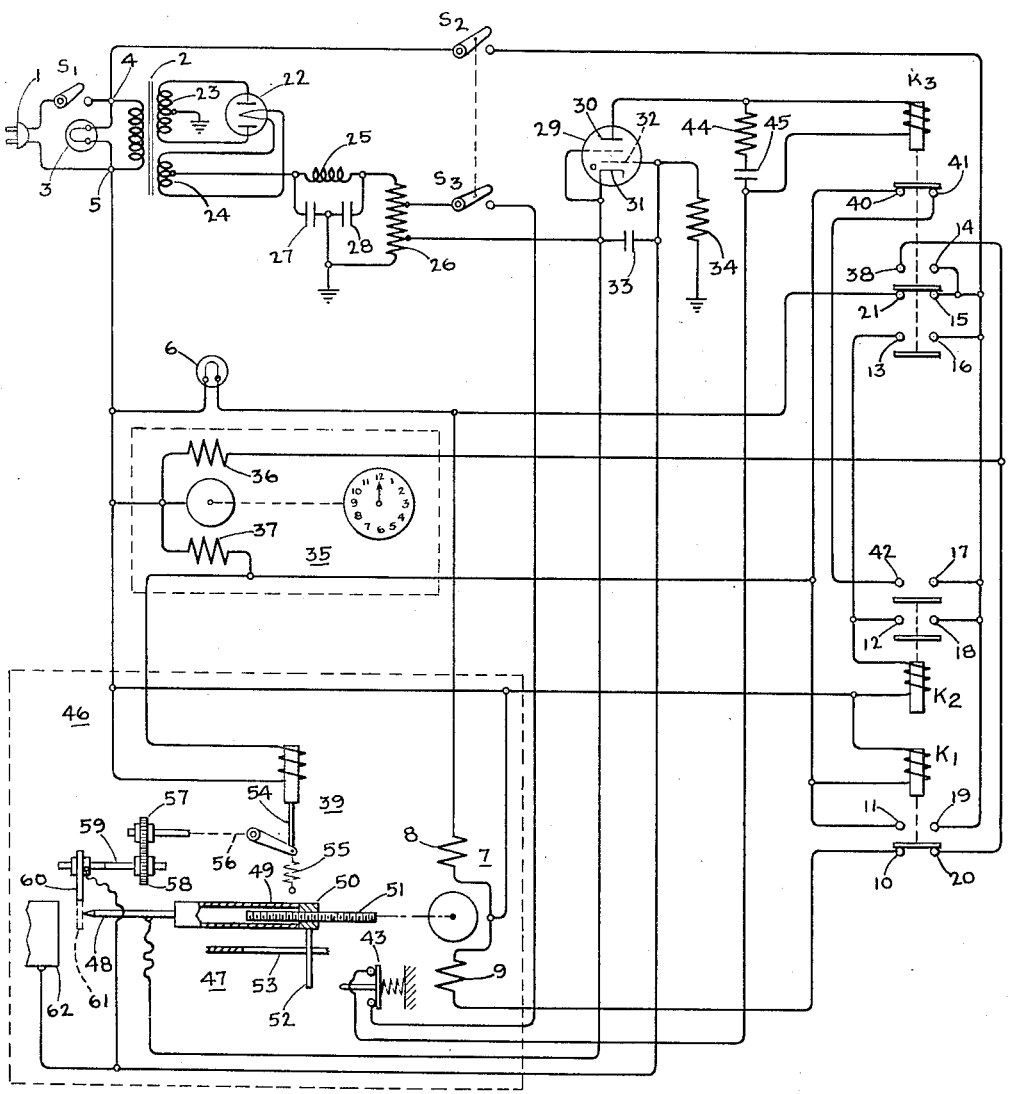

2,554,171

UNITED STATES PATENT OFFICE 2,554,171

AUTOMATIC GAUGING DEVICE

Albert W. Brunot, Lynn, Robert O. Fulton, Boxford, and Ira J. Solomon, Dorchester, Mass., assignors to General Electric Company, a corporation of New York Application July 1, 1950, Serial No. 171,606

3 Claims. (Cl. 33—125)

1

This invention relates generally to automatic gauging devices and more particularly to devices for measuring the clearance between the rotating and stationary parts of a machine.

The efficiency of axial flow compressors in gas or steam turbines is related to the radial clearance between the rotating and stationary parts. This is true both of the clearance between the stator blades and the rotor and the clearance between the rotor blades and the casing. In turbines the latter is the more important and it is this clearance which is measured with the particular instrument described in this application.

While the invention will be described as applied to a measuring device for the measurement of the clearance between the rotating blades of a turbine and the casing, it is to be understood that it is not limited to such application, as the disclosure in this respect is merely illustrative for purposes of explaining the inventive concept.

The measurement of the radial clearance between a rotating blade and a stationary casing is an old problem, and, therefore, several methods for making such measurements have been proposed; some of which have been reduced to practice. Two of these methods are characterized by the mechanical probe and by the lead gauge. The mechanical probe which is inserted through the case to touch the rotating blade is perhaps the most common while the lead gauge which is wiped off by the blade to indicate the minimum clearance has also been used. The lead gauge is limited to rather low temperatures and has the added disadvantage that the unit must be shut down to remove the gauge for measurement in order to attain the desired clearance reading. The mechanical probe has the disadvantage of being applicable at only relatively low temperatures and slow speeds since the operator is required to be alongside the machine to make the reading.

Modern steam and gas turbines and axial flow compressors operate at high speeds and high temperatures, and in many cases are tested in well protected test cells from which the test personnel are barred while the unit is in operation. This means that the clearance cannot be measured directly by the tester but some remote indicating instrument must be used if information on clearance as a function of operating conditions is to be made available to the engineers for analysis. This information together with the performance data may provide the basis for improved design so that the efficiency of the machine may be increased.

2

It is, therefore, an object of this invention to provide a new and reliable means for obtaining the above information while the turbine is in operation.

In the attainment of the foregoing objects an important feature of this invention resides in the familiar mechanical probe, a means for driving the probe in and out of the casing, a sensing device to indicate contact between the probe and a rotating blade or other rotating part, a fixed reference point in the casing, a clearance meter, and a simple fool-proof operating system. The probe is moved or driven in through a hole in the wall of the casing until it strikes the rotating rotor blade at which time it is immediately withdrawn from the casing so as not to injure the blade or the probe. The distance which this probe must move in returning to the inner wall of the casing from the rotor blade is the clearance between the rotor blades and the stationary casing. An electronic circuit arrangement measures this distance.

For additional objects and advantages and for a better understanding of this invention attention is now directed to the following description and accompanying drawing and also to the appended claims in which the features of the invention believed to be novel are particularly pointed out in which the single figure is a schematic circuit diagram of this invention.

Referring to the figure a source of alternating voltage (not shown) is applied to a receptacle 1 which is connected in series with a switch S1 and the primary winding of a transformer 2. A pilot lamp 3 for indicating when power is supplied to the system is connected from terminal 4 to terminal 5 of the primary winding of transformer 2. A pilot light 6 is in parallel with winding 8 of constant speed motor 7 between terminal 5 and contact 21 of relay K3 to indicate when a rotor of this double field motor rotates in a particular direction. The energizing coil of relay K1 is connected between the junctions of windings 8 and 9 and a contact 11, and the energizing coil of a relay K2 is connected between the junction of windings 8 and 9 and contacts 12 and 13. A switch S2 is interconnected between terminal 4 and contacts 14, 15, 16, 17, 18, and 19. A conventional power supply comprises a double diode electronic valve 22 being provided with a pair of anodes. The secondary winding 23 of transformer 2 is connected between the anodes of device 22, and another secondary winding 24 of transformer 2 supplies heating current to the cathode of device 22. The center tap of winding 23 is grounded, and the center tap of winding 24 is connected to an inductor 25 and a resistor 26 to ground. A pair of capacitors 27 and 28 are serially connected across inductor 25, and the junction of these capacitors is grounded. An electronic valve 29 of the type containing an ionizable medium and known in the art as a thyratron is provided with an anode 30, a cathode 31 and a control electrode 32. A tap on resistor 26 is connected to cathode 31 and a capacitor 33 is connected from electrode 32 to cathode 31. A resistor 34 is connected between electrode 32 and ground. A time indicating device 35 includes a synchronous motor which has a pair of windings 36 and 37. Winding 36 is connected between terminal 5 and the junction of contact 20 and a contact 38 and winding 37 is connected between terminal 5 and contact 11. The energizing coil of a device 39 which will be hereinafter described is connected from terminal 5 to the junction of contact 11 and a contact 40. Contact 41 of relay K3 is connected to a contact 42 of relay K2. A two terminal switch 43 has one terminal connected through a switch S3 to a tap on resistor 26 and the other terminal connected through the energizing coil of relay K3 to anode 30. Switches S2 and S3 are ganged together to insure simultaneous operation. A resistor 44 and a capacitor 45 are serially connected across the energizing coil of relay K3.

The portion of the measuring apparatus 46 which is attached to the outer casing of the machine under test includes device 39, motor 7, switch 43 and a mechanical probe arrangement 47. Arrangement 47 includes a mechanical probe 48 which is electrically connected to cathode 31 and mechanically connected to a sleeve 49 which is provided at end 50 with a matching thread for a jack screw 51 which is rotated by the rotor of motor 7. It will be understood that the particular reciprocator shown is by way of illustration only and that other types may be used. An arm 52 which extends from sleeve 49 travels in a slot of a fixed guide 53 which prevents sleeve 50 from rotating as screw 51 is rotated, arm 52 opens the contact switch 43 at a determinable position of probe 48. Device 39 is provided with an energizing coil which draws a member 54 against the tension of a spring 55 and by means of a linkage 56 rotates gear 57 and intermeshing gear 58. Gear 58 in turn rotates shaft 59 to which a flag 60 is fastened. Torque of the necessary magnitude in the energizing coil of device 39 results in flag 60 being moved into the position indicated by the ghost lines 61, such that it intercepts probe 48. Rotor blade 62 and flag 60 are electrically connected to control electrode 32.

In operation device 46 is mounted on the side of the turbine whose blade clearance is to be measured, such that if probe 48 is moved in a longitudinal direction by motor 7, it may pass through a hole provided in the casing wall of the turbine to strike one of the rotating turbine blades 62. Switch 1 is closed lighting lamp 3 and causing the power supply to warm up. After a reasonable warm up time has elapsed switches S2 and S3 are closed simultaneously. Winding 8 is energized across the primary winding of transformer 2 through contacts 21 and 15 and causes jack screw 51 to rotate in a direction which drives probe 48 into a hole provided in the turbine casing. Motor 7 continues to rotate in this direction until jack screw 51 causes probe 48 to make contact with any turbine blade 62. At this time the bias on thyratron 29 which is provided by the voltage drop across that portion of resistor 26 connected between cathode 31 and ground is short circuited which fires the thyratron and thus picks up relay K3. This opens circuit contacts 21 and 15 which deenergizes the field winding 8 and at the same time short circuits contacts 38 and 14 which energizes field winding 9 through contacts 10 and 20 which are connected when relay K1 is in the deenergized position as shown in the drawing. At the same time that relay K3 picks up, winding 36 is energized through contacts 38 and 14 and causes the rotor of the motor of timing device 35 to rotate such that device 35 commences to measure the elapsed time. In the particular apparatus built the time indicating device was merely a clock having a pair of windings 36 and 37 in phase opposition such that the motor of the device could rotate in both directions. The face of the clock was provided with a second hand to measure the time during which device 35 was operative. Relay K2 is also picked up at this time and contacts 12 and 13 are connected to hold relay K2 in the picked up position. The rotor of motor 7 therefore rotates in a reverse direction which withdraws probe 48 from the turbine until such time as arm 52 opens the contacts of switch 43 which removes the anode voltage from thyratron 29 and causes relay K3 to drop out. With relay K3 in the deenergized position winding 8 is again energized reversing the direction of rotation of motor 7 and relay K1 is picked up through contacts 40 and 41 and through contacts 42 and 17 of relay K2 which is still in the energized position due to the action of contacts 12 and 18. At this same time winding 36 is deenergized when contacts 38 and 14 are open circuited and winding 37 is energized through contacts 40 and 41 and contacts 42 and 17. Therefore, at the time motor 7 is reversed the motor of device 35 also rotates in a reversed direction which causes the time indicated on device 35 to decrease. Because the motor of device 35 is a synchronous motor it rotates at the same speed in both directions and, as a result, the time indicated by the device is the difference in the time that voltage is applied to the separate windings 36 and 37. The energizing coil of device 39 being in parallel with winding 37 picks up member 54 which as hereinbefore described moves flag 60 into position 61 such that it intercepts probe 48 as probe 48 is moved back toward the turbine. The contact of probe 48 with flag 60 connects cathode 31 to electrode 32 which fires thyratron 29 and picks up relay K3. Contacts 15 and 21 are again disconnected and winding 8 is deenergized thus stopping motor 7. Winding 37 remains energized, however, through contacts 11 and 19 which also hold relay K1 in the picked up position, and winding 36 is energized through contacts 38 and 14. Dynamic braking of timing device 35 is thus obtained and the motor of the device stops instantaneously. Dynamic braking is used to stop the motor of device 35 because it has been found that if the energizing fields of the motor are merely deenergized, the motor will coast to a standstill and the time required for it to come to a stop is not the same in every instance, which increases the inaccuracy of the measuring system. The time indicated by device 35 is therefore the difference in the time required for probe 48 to be withdrawn from the point of contact with 62 to the point where switch 43 is open, and the time required for probe 48 to return to the point of contact with flag 60. Because motor 7 always rotates at the same speed, the time indicated by device 35 is a measure of the distance between flag 60 and blade 62, and if the distance between the inner wall of the turbine casing and the flag is known the actual clearance measurement between the casing and the blade may be easily computed. The device will remain in a standstill position until switches $S_2$ and $S_3$ have been opened and closed again. Motor 7 is, of course, large enough such that friction in the drive does not cause slippage which results in inaccuracy of the measurement.

This unit has been tested on an axial flow compressor of an aircraft gas turbine under operation at speed approaching 8000 R. P. M. and subjected to the vibration normally acceptable in this equipment. At many points at which duplication of readings was measured, many of the readings were identical but all readings were within one thousandth of an inch.

The instrument described thus provides a simple, accurate, device for the investigation of the clearance in rotating machines. While the present device has been designed for the ground testing of aircraft gas turbines, it is not limited to this field. The principle is equally adaptable to any rotating equipment and may form the basis for improved development and testing of the effect of clearance on the performance of the machines. While it is understood that each type of machine may require modification in the mounting or arrangement of the instrument, it has been demonstrated by test that this instrument will operate in any position, and in the presence of moderate vibration, it will give reproducible and accurate results even though the contact time between the probe and the rotating parts of the machinery is only in the order of 10 microseconds.

While the present invention has been described by reference to particular embodiments thereof, it will be understood that this is by way of illustration of the principles involved and that those skilled in the art may make many modifications in the arrangement and mode of operation. Therefore, we intend by the appended claims to cover any such modifications as fall within the true spirit and scope of this invention.

What we claim as new and desire to secure by Letters Patent of the United States is:

1. Apparatus for automatically obtaining a measurement of the clearance between a fixed casing having a probe opening and a rotary part contained within the casing, comprising a metallic probe mounted exterior of said casing and movable into and out of said casing through said probe opening, a reversible constant speed electric motor for moving said probe into and out of said casing at a known rate of travel, electrical control means for controlling the operation of said motor including a control contact established by contact between said probe and rotating part when the probe is being moved into the casing and causing the reversing of said motor, contact means controlled by movement of said probe out of said casing for causing the reversing of said motor at a predetermined position of said probe with respect to said casing, a contact device movable into and out of the path of movement of the probe between the probe and rotating part and at a predetermined position with respect to the interior wall of said casing at the probe opening therein for stopping said motor when the probe makes contact therewith, means responsive to the second-mentioned motor reversing operation for moving said contact device into the path of movement of said probe, and a timing device the operation of which is correlated with the operation of said probe for measuring the difference between the time interval extending from the first to the second mentioned motor reversing operation and the time interval extending from the second reversing operation to the stopping of said motor as controlled by said third contact device.

2. A device for measuring the clearance between a rotating part and a fixed casing in which it is enclosed, comprising a reversible, constant speed, electric motor, a mechanical probe, means for converting rotational power of the shaft of said motor to linear motion of said probe, said probe being located such that it travels in and out of a hole provided in said casing, a reversible timing mechanism, control means including electronic means for reversing the direction of rotation of said motor and for initiating the operation of said timing mechansm at an instant when said probe contacts said rotating part, a switch operating member mounted on said probe, a switch electrically connected to said timing mechanism and to said motor and located at a determinable fixed position such that said switch operating member actuates said switch at a determinable position of said probe reversing the operation of said timing mechanism and said motor, a metallic flag, electrically operated means for positioning said flag in the path of said probe upon actuation of said switch, and electrical means for arresting the operation of said motor and said timing mechanism at the instant of contact between said probe and said flag.

3. A device for measuring the clearance between a rotating member and a stationary enclosure, comprising a first reversible, constant speed, electric motor, a mechanical probe, a jackscrew drive for converting rotational power of the shaft of said motor to linear motion of said probe, said probe being located such that it travels in and out of a hole provided in said enclosure, a second reversible, constant speed, electric motor, electronic means for reversing the direction of rotation of the shaft of said first motor and for initiating the operation of said second motor at an instant when said probe contacts said rotating member, a revolutions counter being fastened to the shaft of said second motor, an extending member being mounted on said probe and being divergent thereto, a switch being electrically connected to said first and second motors and being located at a determinable fixed position such that said extending member actuates said switch at a determinable position of said probe reversing the direction of rotation of said first motor and initiating the operation of said second motor, a metallic flag, means which in response to actuation of said switch moves said flag into a position at which it intercepts said probe and means arresting the rotation of said first and second motors in response to contact between said probe and said flag.

ALBERT W. BRUNOT.
ROBERT O. FULTON.
IRA J. SOLOMON.

No references cited.